C. J. FECHHEIMER.
METHOD OF STARTING SYNCHRONOUS POLYPHASE MOTORS.
APPLICATION FILED MAY 6, 1913.
1,168,383.
Patented Jan. 18, 1916.
2 SHEETS—SHEET 1.
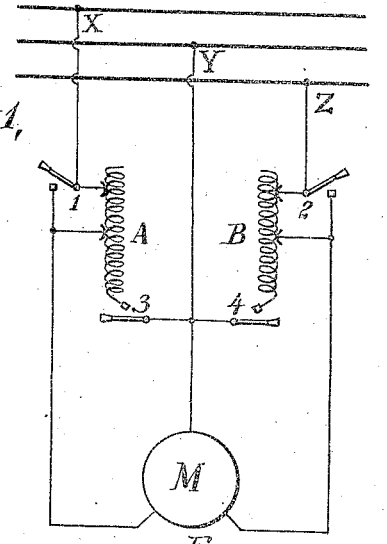
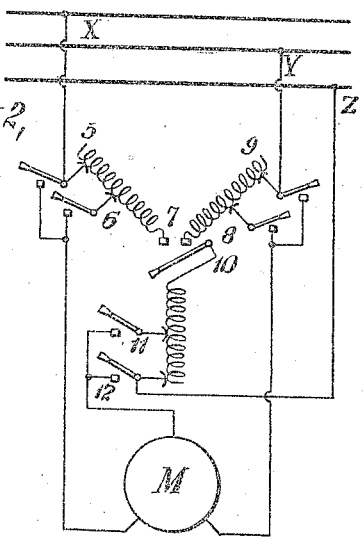
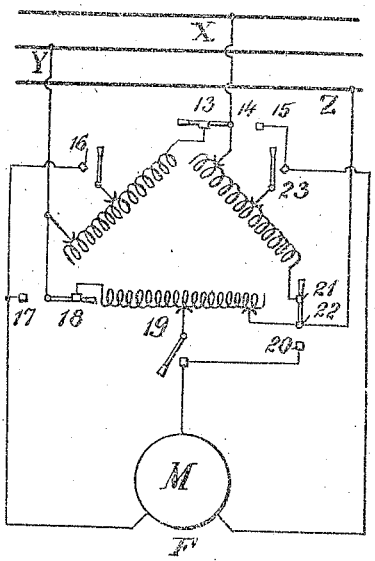
WITNESSES
Alfred E. Frost
George A. Welsh
INVENTOR
Carl J. Fechheimer
BY
Francis B. Crocker
ATTORNEY C. J. FECHHEIMER.
METHOD OF STARTING SYNCHRONOUS POLYPHASE MOTORS.
APPLICATION FILED MAY 6, 1913.
1,168,383.
Patented Jan. 18, 1916.
2 SHEETS—SHEET 2.
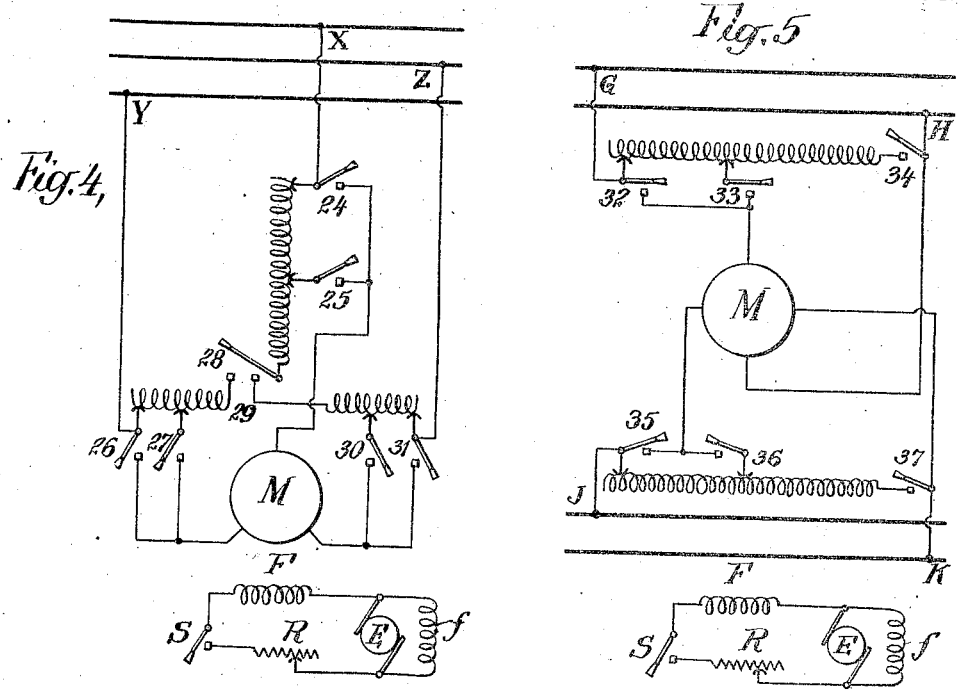
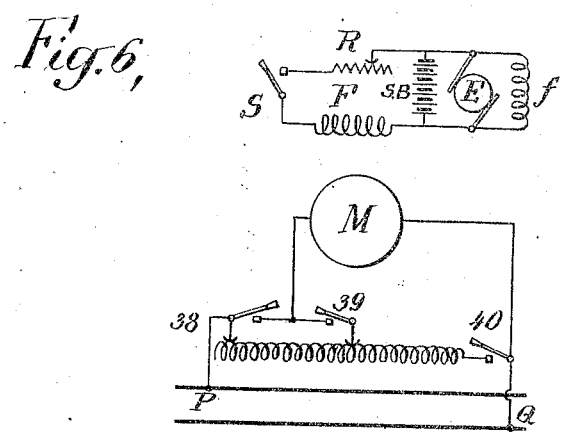

UNITED STATES PATENT OFFICE.

CARL J. FECHHEIMER, OF GLEN RIDGE, NEW JERSEY, ASSIGNOR TO CROCKER-WHEELER COMPANY, OF AMPERE, NEW JERSEY, A CORPORATION OF NEW JERSEY.

METHOD OF STARTING SYNCHRONOUS POLYPHASE MOTORS.

1,168,383.  Specification of Letters Patent.  Patented Jan. 18, 1916.

Application filed May 6, 1913. Serial No. 765,862.

*To all whom it may concern:*

Be it known that I, CARL J. FECH-HEIMER, a citizen of the United States, and resident of Glen Ridge, in the county of Essex and State of New Jersey, have invented certain new and useful Improvements in the Method of Starting Synchronous Polyphase Motors, of which the following is a specification.

My invention relates to methods of starting synchronous alternating current electric motors.

In accordance with my invention I apply to the armature of such a motor one or more voltages which are fractions of the working voltage and may be conveniently obtained from transformers or autotransformers, then I excite the field, after which inductive reactance is introduced into the armature circuit and finally the full voltage is impressed upon it. By my method the motor is started and brought up to synchronism in a very satisfactory manner; at the same time I am able to accomplish this without interrupting the supply of current to the armature and without the use of preventive resistance or reactance usually employed. When my method is used, a synchronous motor does not at any time draw a large amount of current in starting, the maximum current being much less than it is with the methods heretofore employed.

My invention may be applied to single-phase, two-phase, three-phase, four-phase, six-phase, or to any other synchronous alternating current motors, including rotary converters. Moreover it is applicable to various modified arrangements of each class; for example, the star or Y connection as well as the delta, the V and the T connected three-phase arrangements.

In the accompanying drawings which illustrate several of these different arrangements by which my invention may be practised: Figure 1 shows one of the simplest combinations of apparatus and circuits for starting a three-phase synchronous motor, making use of two auto-transformers connected in V relation; Fig. 2 represents the arrangement that may be adopted to start a three-phase synchronous motor utilizing Y connected autotransformers; Fig. 3 shows another three-phase modification employing autotransformers connected in delta; Fig. 4 also shows a three-phase motor which is started by means of T connected autotransformers; Fig. 5 represents a two-phase, synchronous motor arranged to be started in accordance with my invention; and Fig. 6 represents the application of my invention to the starting of a single phase, synchronous motor.

In Fig. 1 the circle marked M indicates the armature, usually the stator, of a three-phase synchronous motor that is to be started; F is its field winding, usually on the rotor; R is a rheostat in series with the field to regulate the exciting current therein; S is a switch that opens or closes the field circuit and E is a dynamo electric exciter or other suitable source that supplies said circuit with direct current. Three line wires X, Y and Z supply the armature M of the motor with three-phase current. The two autotransformers A and B are employed in starting the motor, their connection to the supply lines and to the armature M being clearly shown, also the switches by which the connections are controlled, their operation being fully explained later.

In order to start the motor according to my invention, the switch S is open so that there is no current to excite the field. The switches 3 and 4 are closed and the switches 1 and 2 are open. Two leads of the armature winding of the motor are connected to two taps of the autotransformers, respectively. The third armature lead is connected directly to the supply wire Y. With these connections one half or any other suitable fraction of the line voltage is impressed upon the armature M of the motor in the customary manner. The motor thereupon starts and comes up to speed, locking into synchronism and drawing the usual lagging current. The field F of the motor is then excited by closing the switch S, the current in the field being sufficient to over excite it with the fractional voltage impressed upon the armature, having approximately the value employed for operating the motor at normal voltage with about 100 per cent. power factor. This over excitation of the field advances the phase of the armature current, and the armature tends to draw a leading current at the fractional voltage impressed upon it. The switches 3 and 4 are now opened and we have, instead of two autotransformers, the inductive reactance of the two coils $A^1$ and $B^2$ in series with two of the armature leads, respectively. Inasmuch as the armature tends to draw a leading current, this inductive reactance causes the voltage to rise at the armature terminals until the current falls to a comparatively small value, the power factor approximating unity and the counter E. M. F. being about equal to the line voltage. There may be, however, some time-phase difference between the E. M. F. at the armature terminals and that of the line, but the difference in phase or in magnitude is not sufficient to cause any material disturbance when the switches 1 and 2 are now closed. The motor is thus connected directly to the line, the whole operation having been accomplished without at any time cutting off the current to the armature even momentarily.

In the foregoing description it was stated that the motor would pull into synchronism with a fraction of the line voltage. The characteristics of the load may be such that the motor would not be able to exert sufficient torque to do so with the particular fractional voltage. Under these conditions the excitation of the field which is the next step in the operation of starting, will usually cause the motor to lock into synchronism. In case, therefore, the motor does not get into step before the field is excited it should certainly do so afterward.

One of the distinct advantages of my method is that it insures the correct polarity of the rotor poles after the motor comes into synchronism when the direct current is applied to the field before synchronism is reached. If it is applied afterward and the polarity is not already correct the motor would slip a pole in order to bring the M. M. F. of the stator and that due to the direct current in the rotor into the proper relation. This readjustment will not, however, create nearly as much line disturbance as would be the case if full line voltage were applied to the armature before the field is excited. As already stated, the maximum current drawn at any time is not very large, being seldom more than that required to start the motor from rest when it is started in accordance with my method.

The application of my invention to the starting of a synchronous three-phase motor by means of Y connected autotransformers is shown in Fig. 2. As in all the figures M is the armature and F the field winding of the motor. There are three autotransformers, each having one terminal, (or an adjustable intermediate point as indicated in Fig. 2) connected to one of the supply lines X, Y and Z respectively. The other three terminals are connected together by the switch 10. The three armature leads are respectively connected to the lines X, Y and Z by switches 5, 9 and 12, and to intermediate points of the three autotransformers by switches 6, 8 and 11, as clearly indicated in Fig. 2. In order to start the motor, switches 6, 8, 11 and 10 are closed while switches S, 5, 9 and 12 are open. With these connections the armature M has impressed upon it a suitable fraction of the line voltage, the effect of which is to start the motor and bring it up to or near synchronism. The field is then excited by closing the switch S, the field current being sufficient to overexcite the field with the fractional voltage impressed upon the armature, so that the latter draws a leading current, as in the previous case. The switch 10 is then opened breaking connections at 7, and introducing into the three armature circuits the three impedances 5, 6; 8, 9 and 11, 12 respectively. This causes the voltage at the armature terminals to rise and the current to fall, as before. Finally the three switches 5, 9 and 12 are closed which connects the armature directly with the lines so that it receives full voltage, the whole operation of starting having been performed without opening the armature circuit and with a minimum of current and disturbing effects involved.

In Fig. 3 is represented the starting of a synchronous three-phase motor by means of delta connected autotransformers, according to my invention. As before M is the armature, F the field winding and there are three auto-transformers each having one terminal connected to one of the three-phase supply lines X, Y and Z, respectively. In order to start the motor, the double-throw switches 13, 17 and 22 are closed in the position shown, which completes the delta connection of the three autotransformers. The three switches 16, 19 and 23 are also closed, thereby impressing a proper fraction of line voltage upon the armature M of the motor which starts and comes up to or approximates synchronism. The field is then excited by closing switch S, after which the double throw switches are opened at 13, 17 and 22 and closed at 15, 18 and 20, thus connecting the armature M directly to the lines X, Y and Z. In this manner, the operation of starting is effected according to my invention, without opening the armature circuit and with minimum current and disturbance.

In Fig. 4 the three autotransformers connected in T relation as represented, are employed to start a three-phase synchronous motor in accordance with my invention, the connections, switches and their operation being similar to those already described with reference to the Y connected autotransformers shown in Fig. 2.

In Fig. 5 the application of my invention to the starting of a two-phase synchronous motor is represented, M being its armature and F its field winding with a suitable exciter E, rheostat R and circuit-controlling switch S, as in the case of the three-phase motors already described. One terminal 32 of an autotransformer is connected to one of the lines G of one phase of the circuit, and one terminal 35 of the other autotransformer is connected to a line J of the other phase of the two-phase supply. To start the motor the switches 33, 34, 36 and 37 are closed, 32 and 35 being open, whereby an appropriate fraction of the line voltage is impressed upon the armature M. After the rotor has accelerated until it reaches or approximates synchronous speed, the field F is excited by closing the switch S. Then the switches 34 and 37 are opened thereby introducing the impedances 32, 33 and 35, 36 into the armature circuit, after which the switches 32 and 35 are closed to connect the armature M directly to the two-phase supply lines. In this case as in the others, the starting is accomplished according to my invention without opening the armature circuit and with minimum current and disturbance in the motor or line.

In the drawings I have not shown switches that will entirely disconnect the autotransformers and motors from the supply circuits, because it is obvious that they could be introduced if desired. For the sake of simplicity I have represented only those switches that are actually employed in carrying out my invention. Of course, the various well-known switching, controlling and regulating devices, circuit-breakers, fuses, etc., may be introduced and used wherever and whenever they are desirable, in the manner familiar to those skilled in the art.

It is also evident that the proportions of the various autotransformers with their subdivisions and connections may be altered in the utilization of my invention without departing from it. For example, the taps A and B in Fig. 1, also the taps 6, 8 and 11 as well as those in other modifications of my invention may be connected at any suitable points of the autotransformers to give the desired fractional voltages for starting, accelerating or operating the motors. Moreover it is also obvious that there may be two or more of these taps for each autotransformer to give two or more fractional voltages. These tap connections may also be arranged to be readily shifted or adjusted in position by hand or automatically as indicated at A and B in Fig. 1 and in the other figures, so as to change or regulate the fractional voltages obtained therefrom. The shifting of the position of these taps also has the effect of varying the values of the impedances introduced into the armature circuit during the operation of starting. In this way their values may be altered or adjusted, if desired. These impedances may also be changed by shifting the positions of the connections 1 and 2 in Fig. 1 for example, or the corresponding connections in other cases. In this way the impedances as well as fractional voltages may be either mutually or independently varied or regulated to any desired values.

The application of my method to the starting of a single phase synchronous motor which is represented in Fig. 6 is evidently similar to the case of the two-phase motor already described with reference to Fig. 5, the pair of supply conductors and connections belonging to one-phase being omitted. It is of course necessary to provide some means for starting the single-phase motor. For example an auxiliary direct current motor, which may be the exciter E fed from a storage battery, can be used. It is obvious that other means well known in the art may be used for this purpose. When the synchronous motor represented in Fig. 6 has been started and brought up to or near synchronous speed, the switches 39 and 40 being closed the field is excited by closing the switch S. The field current is of sufficient strength to overexcite the field at the fractional voltage. The switch 40 is then opened thereby introducing the inductive reactance 38, 39 into the armature circuit which has the effects already explained. Finally the switch 38 is closed to connect the armature directly to the supply conductors.

It is evident that my invention may be applied to rotary converters or other forms of apparatus which either wholly or in part consist of or embody synchronous alternating current motors. If such machines are connected to one-, two- or three-phase circuits they may be started in one of the ways already shown and described. In cases for which four-phase or six-phase arrangements are employed, they may make use of twice as many autotransformers and connections as those set forth for the two- and three-phase modifications of my invention respectively.

For the sake of simplicity of construction as well as representation I have shown and described the use of autotransformers in carrying out the various modifications of my invention, but it is obvious that other well known means may be substituted for autotransformers wherever desired without departing from my claims. It is evident also that the inductive reactance introduced into the armature circuit may consist of coils which are not part of the autotransformers. Moreover these coils may or may not be wound upon the magnetic cores of the autotransformers.

Throughout this specification, I have employed in accordance with accepted usage the term field magnet or simply field to designate that element of a synchronous motor which carries the winding supplied with direct current to excite the same, this part being usually the rotor. The other element provided with an alternating current winding, ordinarily the stator, is designated as the armature of the motor.

I claim:

1. The method of starting a synchronous electric motor which consists in impressing upon its armature a fraction of the working voltage, then exciting the field to such a degree that the armature takes a leading current, then disconnecting the armature from the fractional voltage and at the same time introducing sufficient inductive reactance in its circuit so that the power factor approximates unity and finally cutting out said reactance and connecting the armature directly to the supply conductors.

2. The method of starting a synchronous electric motor which consists in impressing upon its armature a fraction of the working voltage, then exciting the field to such a degree that the armature takes a leading current, then disconnecting the armature from the fractional voltage and at the same time introducing sufficient inductive reactance in its circuit so that the power factor approximates unity and finally cutting out said reactance and connecting the armature directly to the supply conductors, these changes being effected without interrupting the armature current.

Signed at Ampere in the county of Essex and State of New Jersey this 2nd day of May A. D. 1913.

CARL J. FECHHEIMER.

Witnesses:
DAVID J. MAHONEY,
FRANCIS B. CROCKER.